US012771670B2

(12) United States Patent
Shah et al.

(10) Patent No.: US 12,771,670 B2
(45) Date of Patent: Oct. 20, 2026

(54) CENTRALIZED IDENTITY REDISTRIBUTION

(71) Applicant: Palo Alto Networks, Inc., Santa Clara, CA (US)

(72) Inventors: Nidhi Shah, San Jose, CA (US); Songling Han, San Ramon, CA (US); Srikanth Ramachandran, Hayward, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/930,678

(22) Filed: Oct. 29, 2024

(65) Prior Publication Data

US 2025/0112893 A1 Apr. 3, 2025

Related U.S. Application Data

(63) Continuation of application No. PCT/IB2023/061381, filed on Nov. 10, 2023.

(60) Provisional application No. 63/425,189, filed on Nov. 14, 2022.

(51) Int. Cl.
*H04L 9/40* (2022.01)

(52) U.S. Cl.
CPC ................................ *H04L 63/0236* (2013.01)

(58) Field of Classification Search
CPC ................................................... H04L 63/0236
See application file for complete search history.

(56) References Cited

U.S. PATENT DOCUMENTS

| | | | | |
|---|---|---|---|---|
| 11,095,612 | B1 * | 8/2021 | Oswal | H04L 63/1416 |
| 2010/0202450 | A1 * | 8/2010 | Ansari | H04L 12/2807 370/389 |
| 2019/0089678 | A1 | 3/2019 | Lam | |
| 2021/0006539 | A1 * | 1/2021 | Zuk | H04L 67/63 |
| 2022/0070223 | A1 | 3/2022 | Deng | |

FOREIGN PATENT DOCUMENTS

| | | |
|---|---|---|
| EP | 3993331 | 5/2023 |
| JP | 2005136631 | 5/2005 |
| JP | 2008508805 | 3/2008 |
| JP | 2008219149 | 9/2008 |
| JP | 2016157323 | 9/2016 |
| JP | 2021033370 | 3/2021 |
| JP | 2022073936 | 5/2022 |

* cited by examiner

*Primary Examiner* — Nicholas P Celani
(74) *Attorney, Agent, or Firm* — Van Pelt, Yi & James LLP

(57) ABSTRACT

Techniques for providing centralized identity redistribution for a security service are disclosed. In some embodiments, a system/process/computer program product for providing centralized identity redistribution for a security service includes receiving user context information (e.g., an IP-user mapping, a user-tag mapping, an IP-tag mapping, an IP-port-user mapping, an IP-device ID mapping, 5G user context information, and/or other user context information/data) at a security platform from a cloud security service; and applying a security policy at the security platform using the user context information.

22 Claims, 17 Drawing Sheets

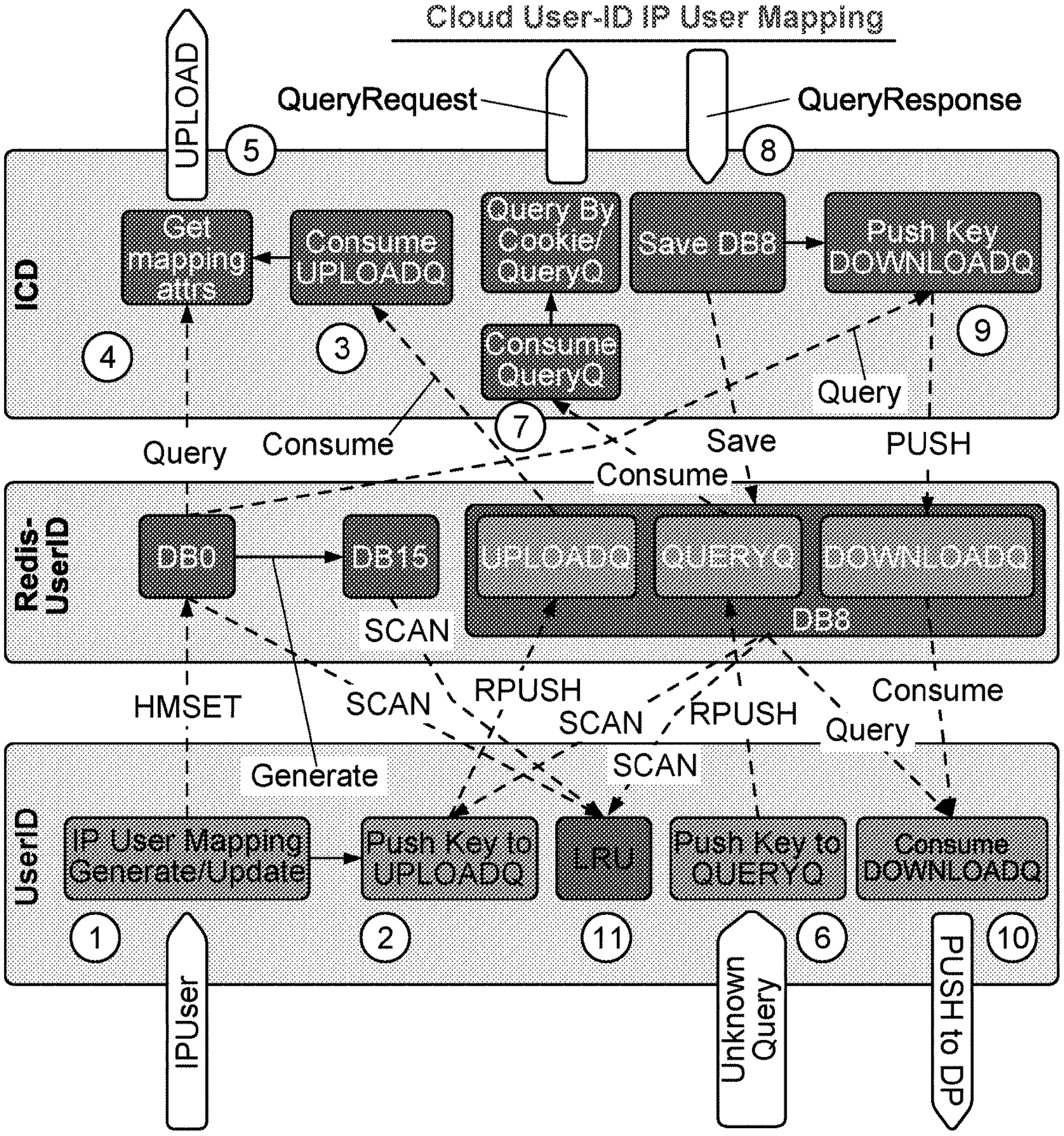

FIG. 3E

Upload workflow:

1. UserID generates or learns IP User Mapping and save it in DB0
2. UserID pushes the Key to UPLOADQ in DB8
3. ICD consumers UPLOADQ from DB8 and get the key
4. ICD queries DB0 to get IP User mapping by the key
5. ICD uploads IP User mappings to the Edge

Unknown Query and Download workflow:

6. UserID receives unknown query from DP and pushes keys to QUERYQ in DB8
7. ICD consumes QUERYQ and generates query/download request with cookie and query list to the edge
8. ICD downloads mappings against cookie and unknown query list. ICD saves mappings to DB8
9. ICD queries DB0 by keys and push keys to DOWNLOADQ
10. UserID consumes DOWNLOADQ and query DB8, then push mappings to DP
11. UserID maintains a time bucket counter based LRU table with 500K limit. UserID needs to count entries in both DB0 and DB8

CENTRALIZED IDENTITY REDISTRIBUTION

CROSS REFERENCE TO OTHER APPLICATIONS

This application is a continuation of PCT Patent Application No. PCT/IB23/61381 entitled CENTRALIZED IDENTITY REDISTRIBUTION filed Nov. 10, 2023, which claims priority to U.S. Provisional Patent Application No. 63/425,189 entitled CENTRALIZED IDENTITY REDISTRIBUTION filed Nov. 14, 2022, both of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

US2022/070223A1, in accordance with its abstract, states techniques for a security platform with external inline processing of assembled selected traffic. In some embodiments, a system/method/computer program product for providing a security platform with external inline processing of assembled selected traffic includes monitoring network traffic of a session at a security platform; selecting a subset of the monitored network traffic associated with the session to send to a cloud-based security service for analysis based on a security policy, wherein the selected subset of the monitored network traffic is proxied to the cloud-based security service; and receiving, from the cloud-based security service, results of the analysis based on the security policy, and performing a responsive action based on the results of the analysis based on the security policy.

EP3993331A1, in accordance with its abstract, states techniques for providing flow meta data exchanges between network and security functions for a security service. In some embodiments, a system/process/computer program product for providing flow meta data exchanges between network and security functions for a security service includes receiving a flow at a network gateway of a security service from a software-defined wide area network (SD-WAN) device; inspecting the flow to determine meta information associated with the flow; and communicating the meta information associated with the flow to the SD-WAN device.

US2019/0089678A1, in accordance with its abstract, states techniques for outbound/inbound lateral traffic punting based upon process risk. In some embodiments, a system/process/computer program product for outbound/inbound lateral traffic punting based upon process risk includes receiving, at a network device on an enterprise network, process identification (ID) information from an endpoint (EP) agent executed on an EP device, in which the process ID information identifies a process that is associated with an outbound or inbound network session on the EP device on the enterprise network, and the EP agent selected the network session for punting to the network device for inspection; monitoring network communications associated with the network session at the network device to identify an application identification (APP ID) for the network session; and performing an action based on a security policy using the process ID information and the APP ID.

SUMMARY

According to an aspect a system is provided, the system comprising: a processor configured to: receive user context information at a security platform from a cloud security service; apply a security policy at the security platform using the user context information; and a memory coupled to the processor and configured to provide the processor with instructions.

In an embodiment, the security platform comprises a physical firewall, virtual machine firewall, or a container-based firewall.

In an optional embodiment, the user context information comprises at least one of an IP-user mapping, a User-tag mapping, an IP-tag mapping, an IP-port-user mapping, and an IP-device ID mapping.

In an embodiment, the security platform subscribes to a segment for centralized identity redistribution.

According to another aspect a method is provided, the method comprising: receiving user context information at a security platform from a cloud security service; and applying a security policy at the security platform using the user context information.

In an embodiment, the security platform comprises a physical firewall, virtual machine firewall, or a container-based firewall.

In an optional embodiment, the user context information comprises at least one of an IP-user mapping, a User-tag mapping, an IP-tag mapping, an IP-port-user mapping, and an IP-device ID mapping.

In an embodiment, the security platform subscribes to a segment for centralized identity redistribution.

According to another aspect a computer program product is provided, the computer program product being embodied in a tangible computer readable storage medium and comprising computer instructions for performing the method as defined herein.

According to another aspect a processor-implemented method is provided, comprising producing at an authenticated security platform user context information and/or obtaining at the security platform user context information from one or more sources; and sending the user context information to a cloud security service. It will be clear that this method may be implemented in the same system as described above.

In an embodiment, the security platform is an edge device in a SD-WAN network, wherein the edge device is configured to act as a connection and/or termination point of the SD-WAN network, wherein the edge device is further configured to connect to the security service via an IPsec tunnel.

In an embodiment, the security platform comprises a physical firewall, virtual machine firewall, or a container-based firewall.

In an embodiment, the security platform publishes to a segment for centralized identity redistribution, wherein preferably the segment is a grouping of security platforms or firewalls.

According to still another aspect a system is provided, wherein the system comprises: a processor configured to: receive user context information from a security platform at a cloud security service; store the user context information in a data store of the cloud security service for redistribution of the user context information to another security platform; and a memory coupled to the processor and configured to provide the processor with instructions.

In an embodiment, the user context information comprises at least one of an IP-user mapping, a User-tag mapping, an IP-tag mapping, an IP-port-user mapping, and an IP-device ID mapping.

In an embodiment, the another security platform subscribes to a segment for centralized identity redistribution to receive the user context information from the cloud security service, and wherein the cloud security service publishes the user context information to the another security platform.

According to another aspect an assembly is provided, the assembly comprising the systems as defined herein.

According to another aspect a method is provided, the method comprising: receiving user context information at a security platform from a cloud security service; and storing the user context information in a data store of the cloud security service for redistribution of the user context information to another security platform.

According to another aspect a computer program product is provided, the computer program product being embodied in a tangible computer readable storage medium and comprising computer instructions for performing the method as defined herein.

BRIEF DESCRIPTION OF THE DRAWINGS

Various embodiments of the invention are disclosed in the following detailed description and the accompanying drawings.

FIG. 3E illustrates an IP user mapping workflow for providing centralized identity redistribution for a security service in accordance with some embodiments.

DETAILED DESCRIPTION

Figure 1A:
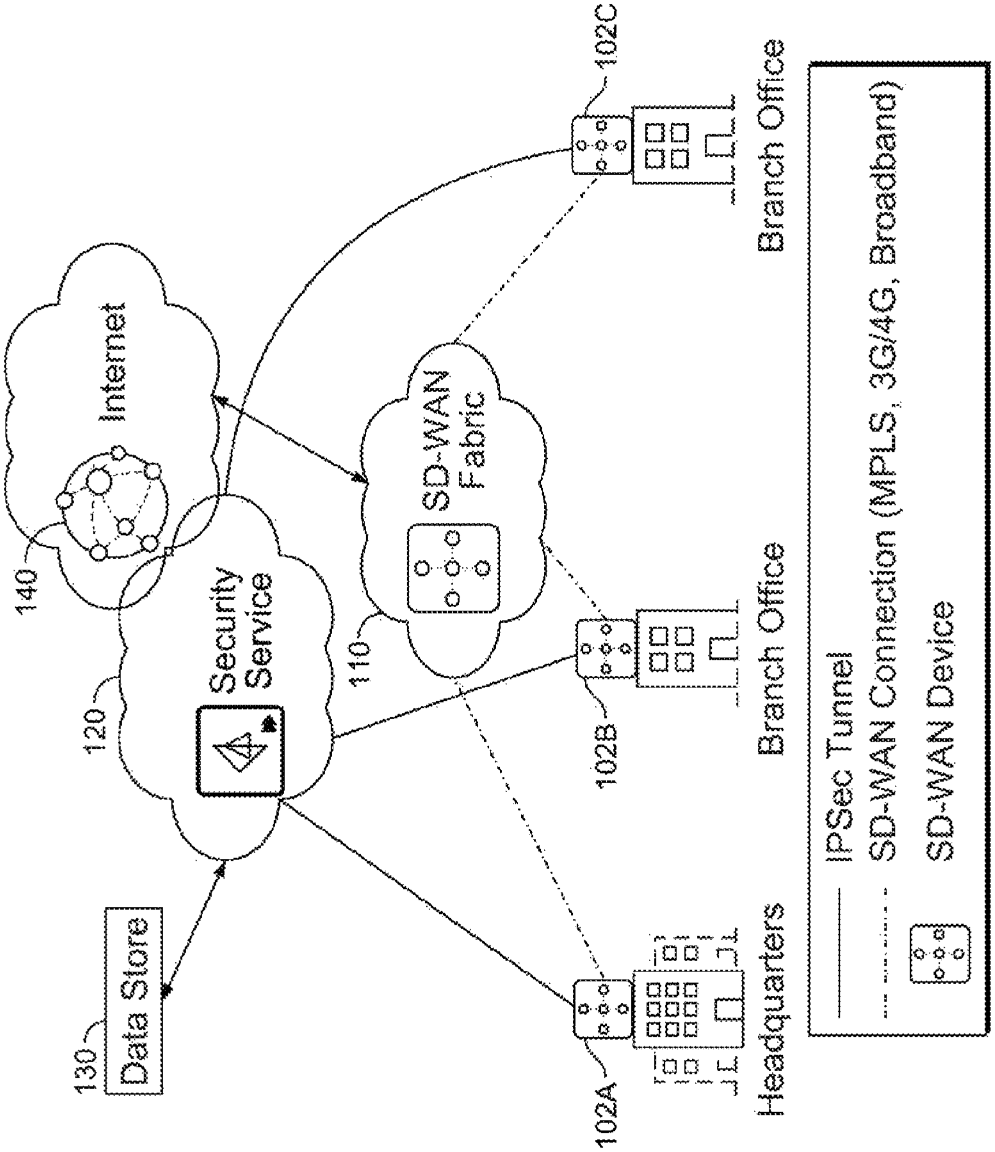
FIGS. 1A-1B are system environment diagrams including example SD-WAN architectures and a security service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QOS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

As an example, advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® NetScaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Providing Centralized Identify Redistribution

Existing approaches for redistribution of user context typically requires a separate protocol for each data type. These approaches are not easily expandable for more data types. Moreover, these approaches generally require complex configuration (e.g., agent-client) deployments and do not provide central visibility of such user context data. Further, such existing approaches provide limited scalability (e.g., limited based on security platform/firewall resources).

As such, technical challenges exist for current security architectures. Specifically, there is a need to have authenticated user identity in any security architecture to ensure secure access to resources and to enforce zero trust (e.g., in enterprise network computing environments).

For example, with an unbounded workforce (e.g., users distributed geographically, and/or hybrid/remote users), security architectures are highly distributed, and distribution of identity context learned locally (e.g., IP-user, user-tag, IP-tag, IP-port-user, IP-device ID, and/or various other identity contexts) to the entire security architecture for consistent application of security is a significant technical challenge. Also, deploying and debugging issues with user context redistribution is also a complex technical challenge.

Thus, what is needed is a solution that provides real-time user context redistribution for timely and effective enforcement of security policies.

It is also desired to provide user context that is available for consumption to security entities/devices (e.g., firewalls, gateways, etc.) as well as to SD-WAN environments.

It is also desired to provide a point(s) of redistribution that is highly available and robust (e.g., to avoid creating a single point of failure).

It is also desired to provide a solution for redistribution of identity context that is expandable for other context types (e.g., 5G data, device-ID, etc.).

Accordingly, various techniques for centralized identity redistribution are disclosed.

In some embodiments, a system/process/computer program product for centralized identity redistribution for a security service includes receiving user context information (e.g., an IP-user mapping, a User-tag mapping, an IP-tag mapping, an IP-port-user mapping, an IP-device ID mapping, 5G user context information, and/or other user context information/data) at a security platform from a cloud security service; and applying a security policy at the security platform using the user context information. In an example, the security system applies user context information in policies based on a type of user context information. Some user context information, such as User-tag mapping, IP-tag mapping, IP-port mapping, IP-port-user mapping, may for example be used to directly apply a policy, whereas some types, such as 5G data, device-ID, are used to determine membership of an object used in a policy.

In some embodiments, a system/process/computer program product for centralized identity redistribution for a security service includes sending user context information (e.g., an IP-user mapping, a User-tag mapping, an IP-tag mapping, an IP-port-user mapping, an IP-device ID mapping, 5G user context information, and/or other user context information/data) from a security platform to a cloud security service; and storing the user context information in a data store of the cloud security service for redistribution of the user context information to another security platform. The disclosed techniques for centralized identify redistribution allows to learn user context information at a security platform and to apply a security policy using said user context information at a security platform that is different from the security platform where the user context information was learned. It will be clear that a security platform can be configured to both send and receive user context information.

For example, the disclosed techniques for centralized identity redistribution can be implemented across all security platforms, including physical firewalls as well as virtual machine (VM) and container firewalls.

As another example, the disclosed techniques for centralized identity redistribution can be implemented to facilitate segment-based flow control for identity information/data.

Moreover, the disclosed techniques for centralized identity redistribution can simplify and unify redistribution of user context. For example, the disclosed techniques for centralized identity redistribution can simplify and unify redistribution of user context and can provide a central location/source to consume all user context information.

In addition, the disclosed techniques for centralized identity redistribution generally do not require any changes in existing enterprise customer deployments. For example, the disclosed techniques can facilitate cloud-based identity redistribution across regions, in which adding/deleting security platforms (e.g., firewalls, devices, etc.) is simple and generally does not require any configuration changes.

Finally, the disclosed techniques for centralized identity redistribution facilitate reduced CPU and memory resource usage on each security platform (e.g., firewall, gateway/device, etc.) as most processing/merging can be implemented to be performed using cloud resources and receiving data from, for example, only a centralized/single source.

Accordingly, various techniques for centralized identity redistribution for a security service are disclosed as will also be further described below.

Figure 1B:
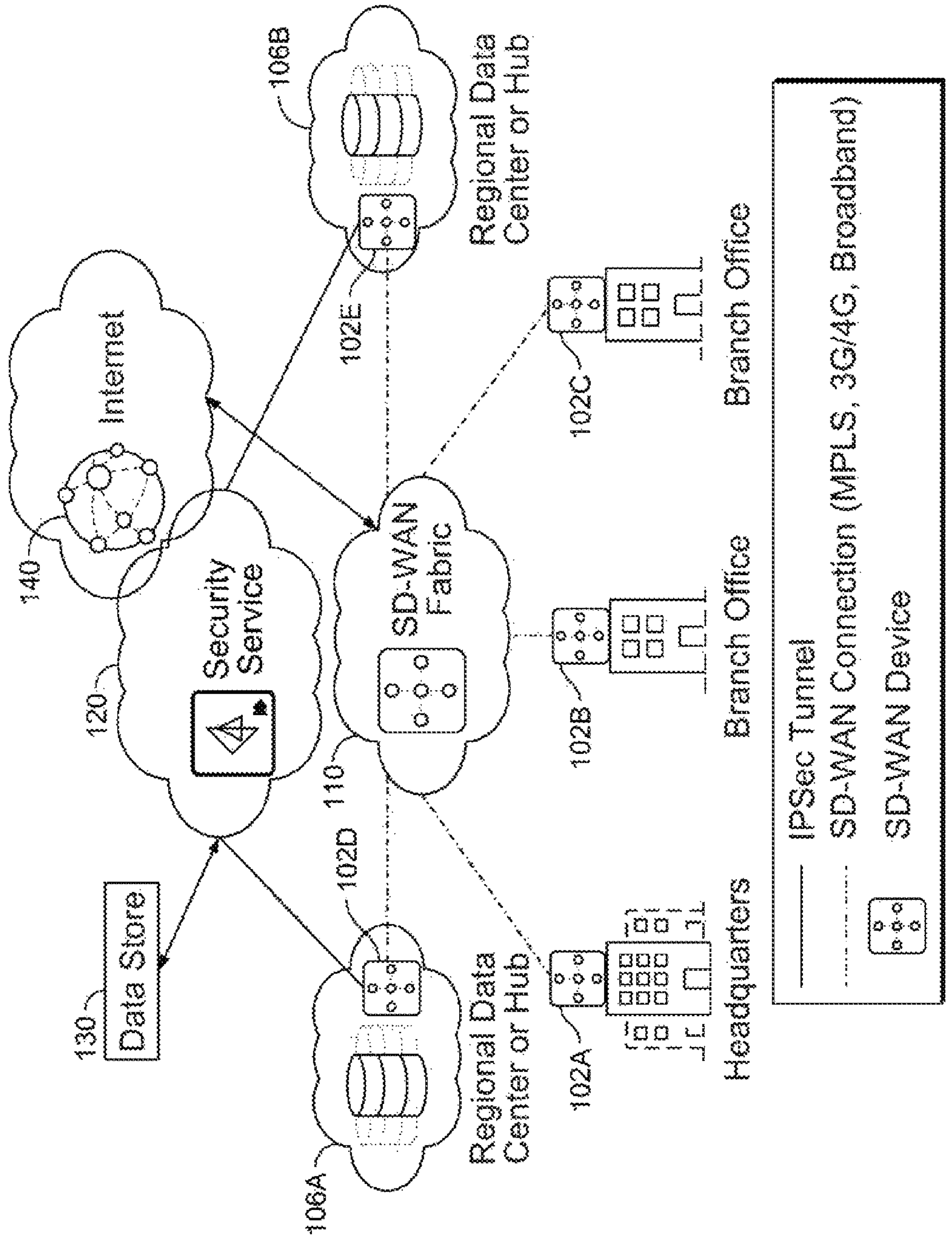

System Environments Including Example Cloud User Context Architectures for Centralized Identity Redistribution for a Security Service FIGS. 1A-1B are system environment diagrams including example SD-WAN architectures and a security service in accordance with some embodiments. These example system diagrams generally illustrate a security service for securing branch office and headquarter sites with SD-WAN connections in communication with a security service (e.g., a cloud-based security service).

As organizations grow across different geographical locations, choosing a network becomes a delicate balancing act of cost, performance, and security. A software-defined WAN (SD-WAN) simplifies the management and operation of a WAN by separating the networking hardware (the data plane) from its control mechanism (the control plane). SD-WAN technology allows companies to build higher-performance WANs using lower-cost Internet access. With the adoption of SD-WANs, organizations are increasingly connecting directly to the Internet, introducing security challenges to protect remote networks and mobile users. Additionally, the deployment of Software as a Service (SaaS) applications has significantly increased, with many organizations directly connecting to such cloud-based SaaS applications, introducing additional security challenges. The adoption of SD-WAN technology introduces many benefits in cost savings and enables organizations to be agile and optimized. However, it also makes branch offices and users targets of cyber-attacks and other technical security challenges as similarly described above.

SD-WAN security generally is desired to be as flexible as the networking, but it is also technically challenging to adapt traditional security approaches to such evolving SD-WAN networking in various enterprise network environments such as shown in FIGS. 1A and 1B as will be described below. In a traditional campus network design, there is a full stack of network security appliances at the Internet perimeter that can protect the branch, which is true if all traffic is brought through the core network to pass through such a full stack of network security appliances at the Internet perimeter. However, SD-WANs do not always use this network architecture, such as if the SD-WANs are configured to integrate cloud/SaaS applications.

An alternative to the traditional approach is to deploy network security appliances at the branch office. However, this traditional approach complicates the deployment as it brings the security device/element closer to the branch office.

SD-WAN technology generally uses the principles of software-defined networking (SDN) and separates the control plane and the data plane. Based on this principle, SD-WAN deployments generally include the following components: (1) a controller that administrators use to centrally configure WAN topologies and define traffic path rules; and (2) SD-WAN edge devices, either physical or virtual, that reside at every site and act as the connection and termination points of the SD-WAN fabric.

In an example SD-WAN Type 1 deployment (e.g., branches and headquarters deployment), at each branch site, organizations can deploy one or more SD-WAN edge devices and connect them to form an SD-WAN fabric or SD-WAN overlay. Administrators use the SD-WAN controller, based either in the cloud or on the organization's premises, to manage and configure these edge devices and define the traffic forwarding policies at each site.

Referring to FIG. 1A for an example deployment (e.g., branches, headquarters, and regional data center deployment), the IPSec tunnels are setup between each of the SD-WAN edge devices 102A, 102B, and 102C at each data center (e.g., including IPSec tunnels between the SD-WAN edge device(s) at each branch and headquarters site) and a security service 120 (e.g., a cloud-based security service, such as provided via Prisma Access (PA), which is a commercially available cloud-based security service from Palo Alto Networks, Inc. headquartered in Santa Clara, CA). This example system diagram is an example deployment for securing traffic from each branch site with one WAN link (Type 1) as shown at 110. SD-WAN Fabric 110 and security service 120 are each in communication with the Internet 140. Security service 120 is in communication with a data store 130 (e.g., a data store for network/security logging data, such as a Cortex™ data lake, which is commercially available from Palo Alto Networks, Inc. headquartered in Santa Clara, CA).

Specifically, this architecture adds SD-WAN devices in regional data centers, along with the SD-WAN devices at each branch and headquarters site. These regional data centers can be public or private cloud environments. SD-WAN devices at the regional data center aggregate network traffic for smaller sites in that region. For example, organizations can use this deployment when there are multiple regional branch sites with lower bandwidth connections to the Internet.

Referring to FIG. 1B, for another example deployment (e.g., branches, headquarters, and regional data center), the IPSec tunnels are setup between the SD-WAN edge device at each data center (e.g., including at SD-WAN devices 102D and 102E) and a security service 120 (e.g., a cloud-based security service, such as provided via Prisma Access (PA), which is a commercially available cloud-based security service from Palo Alto Networks, Inc. headquartered in Santa Clara, CA). This example system diagram is an example deployment for securing SD-WAN deployments with Regional Hub/POP architectures. As shown, the IPSec tunnels are set up between each of the regional data centers or hubs 106A and 106B and the security service 120.

A common network architecture today is to tunnel traffic between an enterprise's headquarters and branches over either MPLS links or dedicated encrypted VPN links. As more and more services are cloud-based (e.g., including SaaS solutions, such as Microsoft Office 365®, Salesforce®, etc.), and more information is available on the Internet, it generally makes less sense to tunnel traffic back to an aggregation point before routing it to its final destination. Breaking out traffic locally from the branches (e.g., as opposed to an on-premises appliance) generally allows traffic to reach its destination faster and makes a more efficient use of bandwidth. However, allowing traffic directly between devices in the branch and the Internet also introduces new technical security challenges as similarly described above.

Specifically, in these and other example SD-WAN architectures and a security service, flows can be configured to pass through the security service 120 or to bypass the security service 120 and be routed to a regional data center or hub or the Internet without passing through the security service 120. As such, these and other example SD-WAN architectures and a security service give rise to the above-described technical security problems as traffic that passes through the security service is inefficiently inspected/monitored (e.g., DPI or other monitoring/inspection activities) at both the egress SD-WAN device/element as well as the security service. In addition, these and other example SD-WAN architectures and a security service give rise to the above-described technical security problems as traffic that bypasses the security service is not consistently inspected/monitored and analytics for security insights for network and security functions for the security service would not be collected.

As such, the disclosed techniques for centralized identity redistribution can be performed in these example SD-WAN architectures and a security service as will be further described below with respect to FIG. 2.

Figure 2:
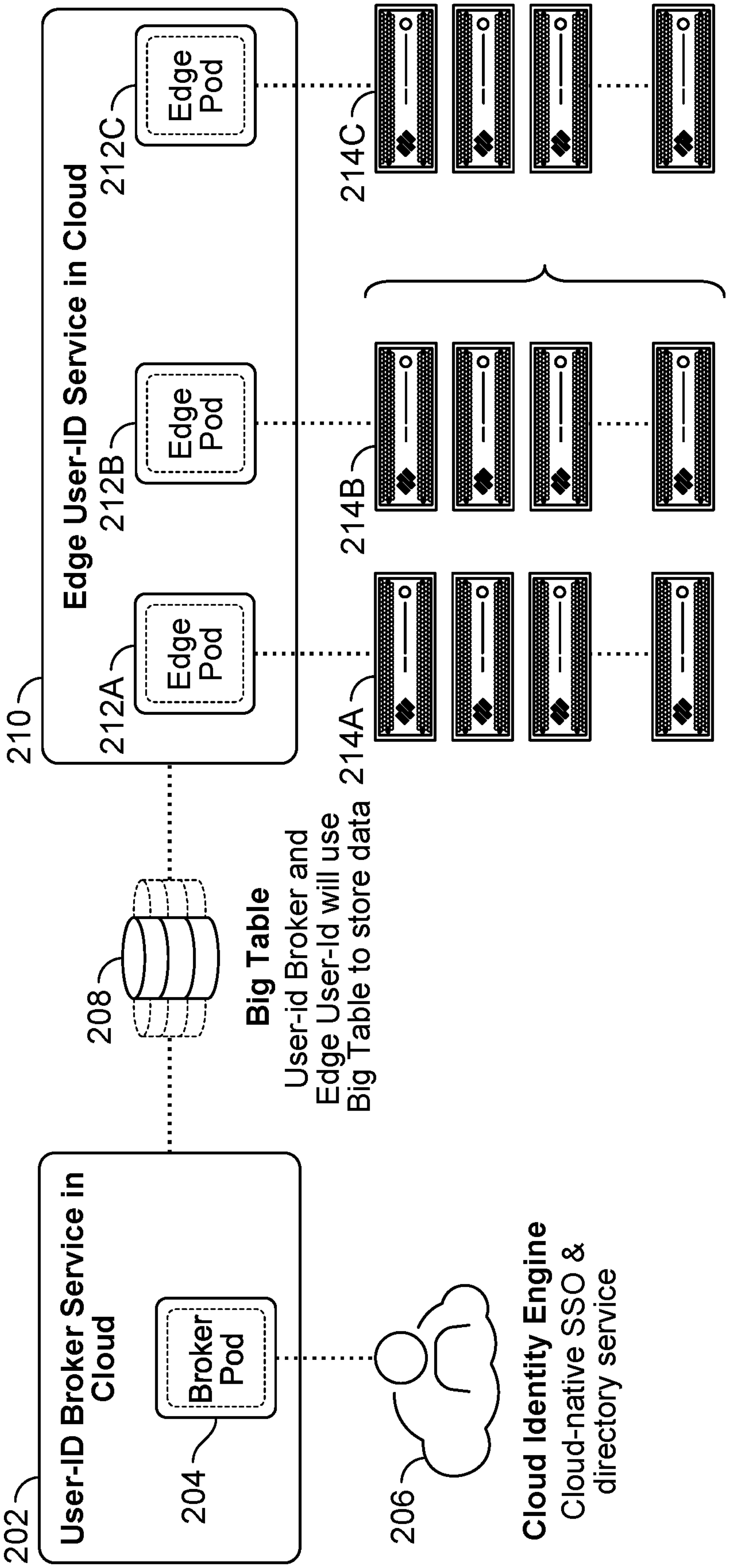
FIG. 2 is a cloud user context architecture for centralized identity redistribution for a security service in accordance with some embodiments.

FIG. 2 is a cloud user context architecture for centralized identity redistribution for a security service in accordance with some embodiments. User-ID component is generally a central component to security policies (e.g., firewall policies) and User-ID component is a backbone of many security design principles. The disclosed techniques for centralized identity redistribution provide a global context that is capable of consuming and providing user context to all downstream consumers as will now be further described with respect to FIG. 2.

Referring to FIG. 2, User-ID Broker Service 202 is a cloud component that provides an Application Programming Interface (API) gateway. The User-ID Broker Service includes one or more Broker Pods 204. The User-ID Broker Service can accept data from any authorized entity (e.g., including non-PAN-OS entities/firewalls), such as a Cloud Identity Engine (CIE) 206 (e.g., a cloud-native single sign-on (SSO) and directory service that facilitates a centralized visibility and channel/segment configuration as will be further described below), via an API (e.g., a REST API). The User-ID Broker Service can accept data for any data type and is easily expandable for more data types (e.g., User-ID, Device-ID, 5G data, etc.). Edge User-ID Service 210 is another cloud component that interacts with security platforms 214A, 214B, and 214C (e.g., Palo Alto Networks firewalls and/or other compliant devices/entities) as shown in FIG. 2.

As also shown in FIG. 2, the Edge User-ID Service includes Edge Pods 212A, 212B, and 212C as shown. The Edge User-ID Service accepts and sends data (e.g., user context/identity information/data) from these devices/entities over a communication protocol (e.g., gRPC). The Edge User-ID Service and User-ID Broker Service share data via a data store, shown as BigTable 208 (e.g., Edge User-ID Service and User-ID Broker Service can store data in the BigTable, which can be implemented using the Google Cloud Big Table data store solution that is commercially available from Google or another cloud data store can similarly be implemented). As further described below, the user context/identity information can be distributed using a publish and subscribe distribution model (e.g., publish and subscribe to Segments, such as will be further described below with respect to FIG. 3A).

Figure 3A:
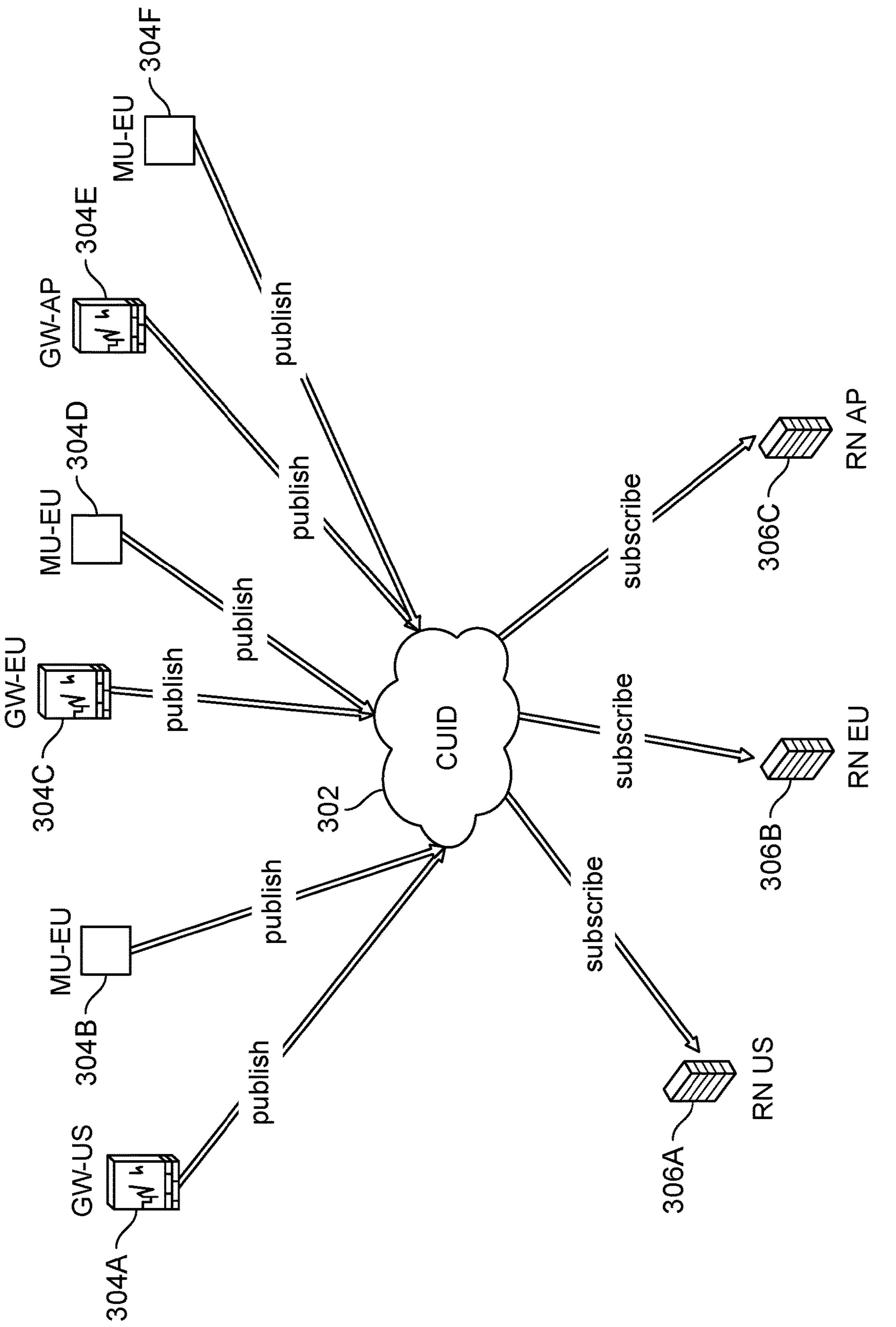
FIG. 3A illustrates an architecture overview of user context information grouping in segments and sharing for providing centralized identity redistribution for a security service in accordance with some embodiments.

FIG. 3A illustrates an architecture overview of user context information grouping in segments and sharing for providing centralized identity redistribution for a security service in accordance with some embodiments. In this example, incoming traffic on a firewall (device) is attributed to an identified user based on its IP address. User context information (e.g., IP-Tag, IP-User mappings, IP-Port-User, IP-Quarantine, User-Tag, etc.) is associated with the IP address that is available through a cloud-based redistribution service (e.g., providing redistribution periodically, such as every two seconds or some other periodic interval for time-sensitive user context data for providing real-time user context redistribution for timely and effective enforcement of a security policy), such as similarly described above with respect to FIG. 2. Cloud User ID (CUID) 302 (e.g., an example implementation of User-ID Broker Service in the cloud that is shown at 202 in FIG. 2) is a multi-tenant redistribution service hosted in multiple cloud regions. Security platforms (e.g., firewalls and/or other security devices/entities) as shown at 304A, 304B, 304C, 304D, 304E, and 304F can be grouped into "segments" and the redistribution of user context/identity information/data can be restricted to stay within segments, such as Remote Networks (RNs) for the United States (US) region, Europe (EU) region, and Asia Pacific (AP) region, such as shown at 306A, 306B, and 306C.

In this example implementation, any authenticated security platform (e.g., firewall and/or other security device/entity, such as shown at 304A, 304B, 304C, 304D, 304E, and 304F in FIG. 3A) producing user-context information can be configured to publish to a segment in the CUID. Also, any authenticated security platform (e.g., firewall and/or other security device/entity) can subscribe to a segment(s) (e.g., RN US 306A, RN EU 306B, and/or RN AP 306C as shown in FIG. 3A) to consume user-context information for the specific tenant.

Figure 3B:
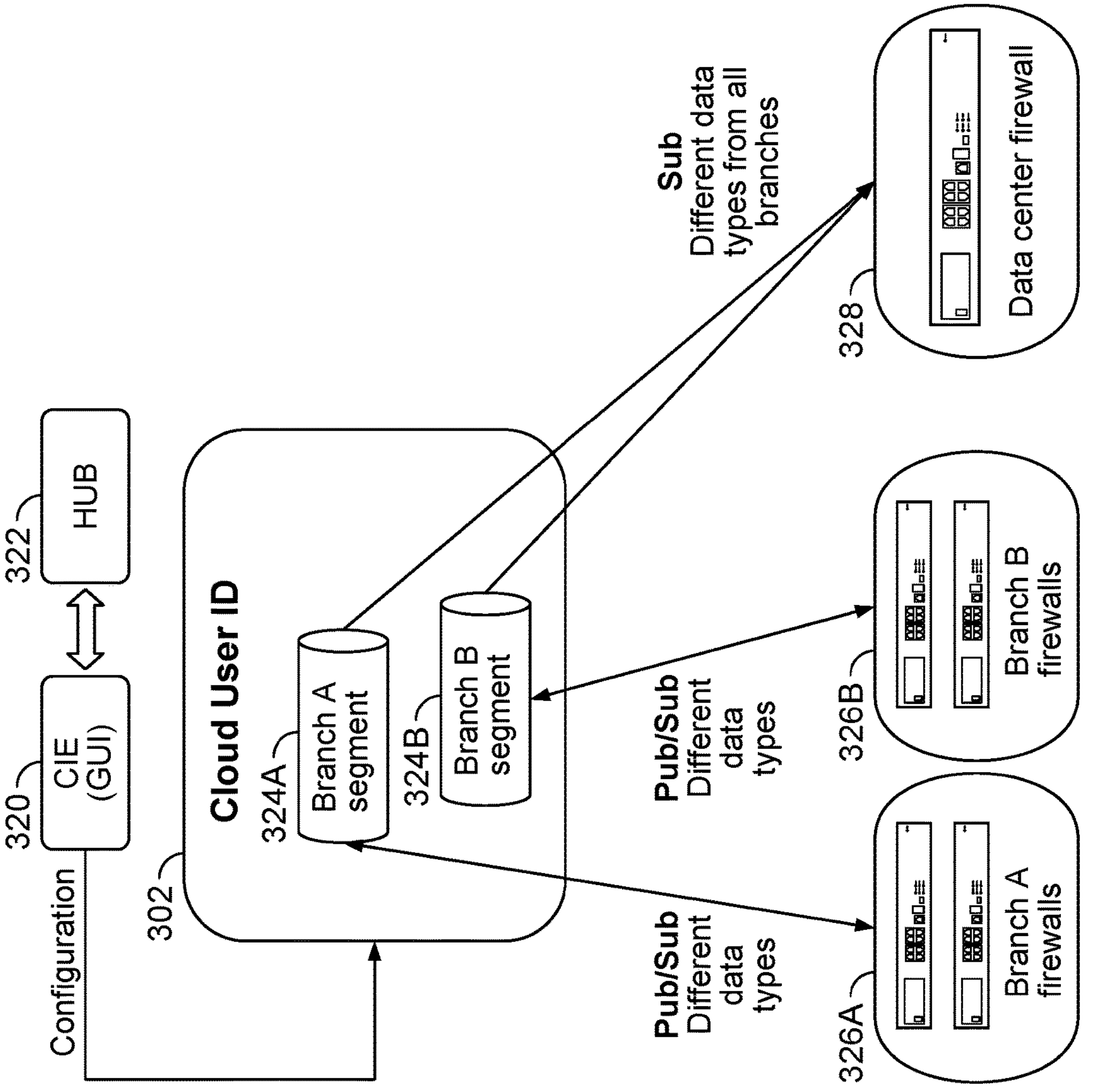
FIG. 3B illustrates another architecture overview of user context information grouping in segments and sharing for providing centralized identity redistribution for a security service in accordance with some embodiments.

FIG. 3B illustrates another architecture overview of user context information grouping in segments and sharing for providing centralized identity redistribution for a security service in accordance with some embodiments. In this example implementation, configuration is centralized and contributing security platforms (e.g., firewalls and/or other security devices/entities) generally do not need to know about any configuration related to redistribution. Configuration of CUID 302 can be performed using CIE interface (e.g., GUI) 320 via a HUB 322. As similarly described above with respect to FIG. 3A, the CUID can replicate data to make user context information/data available across segments (e.g., regions and/or another segmentation can be configured), ensuring secure access regardless of a location of the user.

Referring to FIG. 3B, CUID 302 includes a Branch A segment 324A and a Branch B segment 324B. Branch A firewalls 326A are in publish/subscribe communication of different user context data types with Branch A segment 324A. Branch B firewalls 326B are in publish/subscribe communication of different user context data types with Branch B segment 324B. Data center firewall 328 is in publish/subscribe communication of different user context data types with all branches, which includes Branch A segment 324A and Branch B segment 324B in this example implementation as shown in FIG. 3B.

Figure 3C:
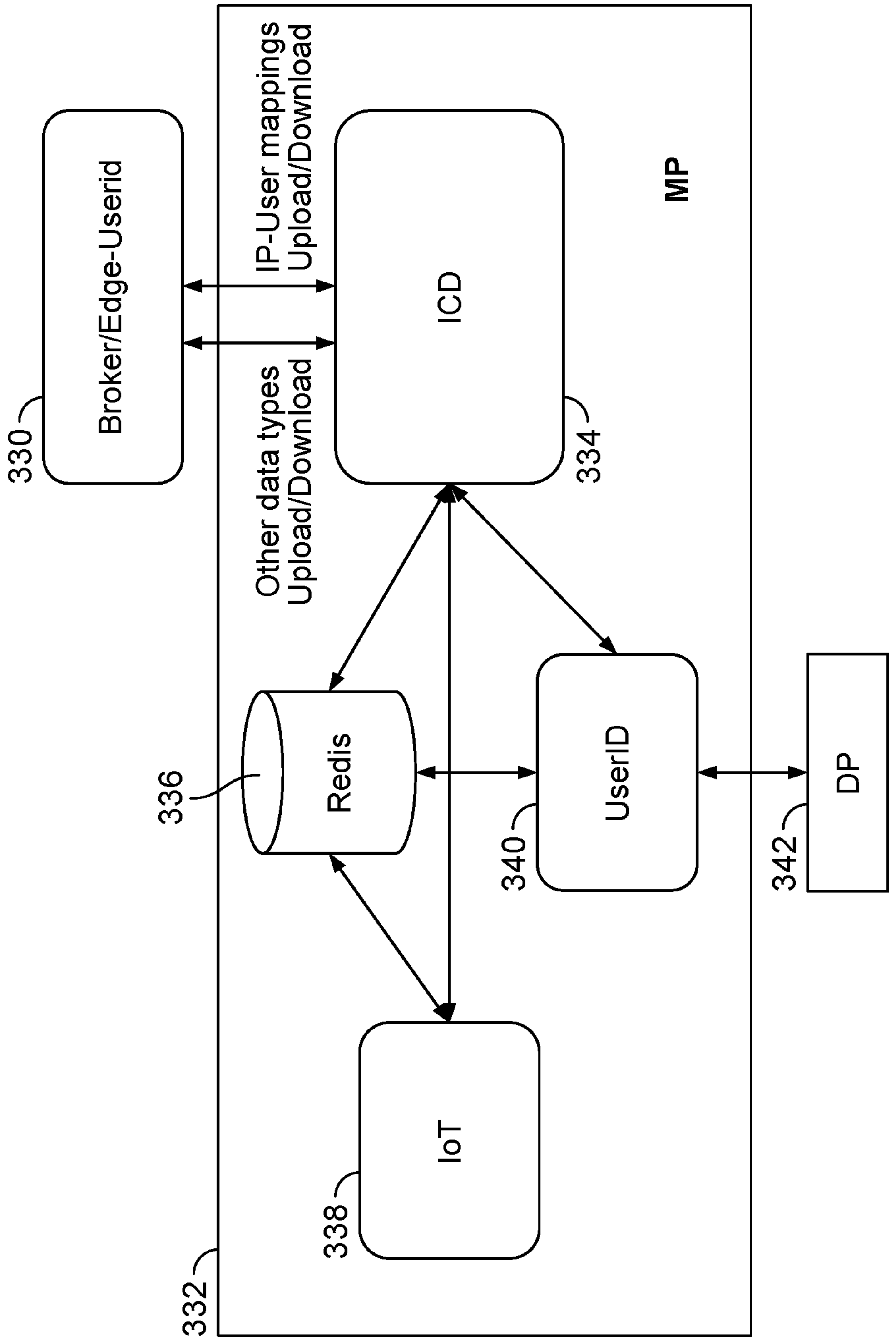
FIG. 3C illustrates an architecture for firewall daemons for providing centralized identity redistribution for a security service in accordance with some embodiments.

FIG. 3C illustrates an architecture for firewall daemons for providing centralized identity redistribution for a security service in accordance with some embodiments. In this example implementation, a cloud service User-ID Broker (e.g., User-ID Broker Service in the cloud as shown at 202 in FIG. 2) communicates/interacts with the CIE (e.g., Cloud Identity Engine 206, such as shown in FIG. 2). The Edge User-ID service (e.g., Edge User-ID Service in the Cloud as shown at 210 in FIG. 2) collects user context information/data from and distributes user context information/data to all security platforms based on a distribution (e.g., publish/subscribe) model (e.g., firewalls and/or other security devices/entities for the security service). As also similarly described above with respect to FIG. 2, the User-ID Broker and Edge User-ID use the Big Table (e.g., BigTable 208 as shown in FIG. 2) to store such user context/identity data. As similarly described above with respect to FIGS. 3A and 3B, segments can be used to group security platforms (e.g., firewalls and/or other security devices/entities for the security service) to restrict data flow for a specific tenant(s). The Edge User-ID receives the security platform to segment mappings from the CIE via the Broker. The CIE queries the Broker to obtain user context/identity data for visibility requirements.

Referring to FIG. 3C, a Broker/Edge-User-ID 330 is in communication with a management plane 332 of a security platform (e.g., firewall and/or other security device/entity). Specifically, an Identity Cloud Daemon (ICD) 334 of the management plane of the security platform is in communication with the Broker/Edge-User-ID to communicate IP-User mappings (e.g., PAN-OS User-ID) (upload/download) and to communicate other data types (upload/download). ICD 334 communicates with User-ID component 340 (e.g., PAN-OS User-ID component in this example implementation for a PAN-OS firewall, which is in communication with the data plane (DP) of the PAN-OS firewall as shown at 342) to upload data to the Edge User-ID service. In addition, ICD 334 fetches data from the Edge User-ID service and sends it to User-ID component 340 or IoT component 338 based on the data type. Redis component 336 is an in-memory data store (e.g., the Redis component can be implemented using Hiredis, a minimalistic C client library for the Redis database or another commercially available or open source redis solution can similarly be used). Host Information Profile (HIP) information can similarly be redistributed and made available via the cloud using similar techniques.

Figure 3D:
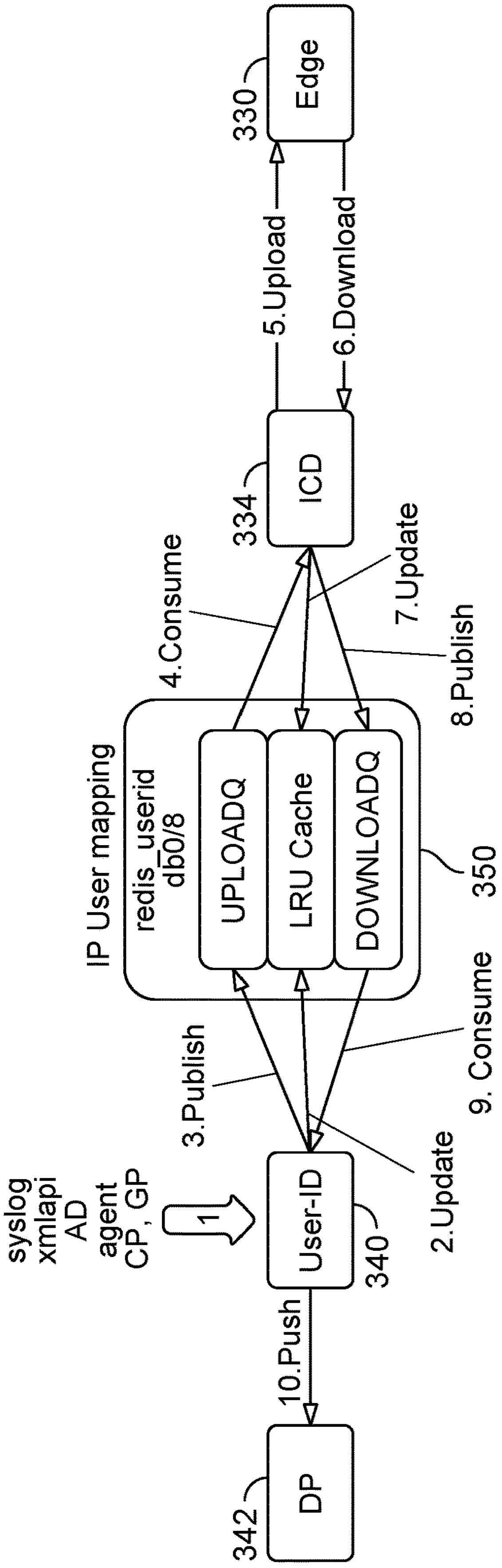
FIG. 3D illustrates an architecture for an IP user mapping that can be uploaded and downloaded to the cloud for providing centralized identity redistribution for a security service in accordance with some embodiments.

FIG. 3D illustrates an architecture for an IP user mapping that can be uploaded and downloaded to the cloud for providing centralized identity redistribution for a security service in accordance with some embodiments. As shown, User-ID component 340 receives IP User mappings 350 from various sources (e.g., Syslog, XMLAPI, Active Directory (AD), Agent, Captive Portal (CP) (e.g., when a user initiates web traffic (HTTP or HTTPS) that matches an Authentication Policy rule, the PAN-OS firewall can be configured to prompt the user to authenticate through Captive Portal (CP), which ensures that we know exactly who is accessing, for example, sensitive applications and data; based on user information collected during authentication, the firewall can then create a new IP address-to-username mapping or update the existing mapping for that user; for example, this method of user mapping can be useful in environments in which the firewall cannot learn mappings through other techniques such as monitoring servers, e.g., you might have users who are not logged in to your monitored domain servers, such as users on Linux clients), VPNs such as GlobalProtect (GP) that is commercially available from Palo Alto Networks, Inc. headquartered in Santa Clara, CA, etc.). User-ID component 340 updates mappings to the LRU cache as shown. The IP address can be used as the key of the LRU cache. User-ID component 340 publishes updates to a Redis list, which can be used as an upload queue as shown. The key name of the list is "UPLOADQ." "UPLOADQ" is a list of IP Addresses. ICD 334 consumes IP User mappings from the "UPLOADQ." ICD 334 uploads the IP User mappings to Edge (i.e. Broker/Edge-User-ID) 330 as shown. As also shown, ICD 334 downloads IP User mappings from Edge 330. ICD 334 saves the IP User mappings to the LRU cache (e.g., the LRU cache size can be implemented as a 500K cache by default or some other cache size can be similarly implemented in IP User mapping component 350). ICD 334 publishes IP User mappings to a Redis list that is used as a download queue. The key name of the list is "DOWNLOADQ" (e.g., the "DOWNLOADLOADQ" is a list of IP Addresses). User-ID component 340 consumes the "DOWNLOADQ." User-ID component 340 pushes IP User mappings to DP 342.

FIG. 3E illustrates an IP user mapping workflow for providing centralized identity redistribution for a security service in accordance with some embodiments. FIG. 3E illustrates an example implementation of an upload workflow as well as an unknown query and download workflow for a Cloud User-ID IP User Mapping.

Figure 3F:
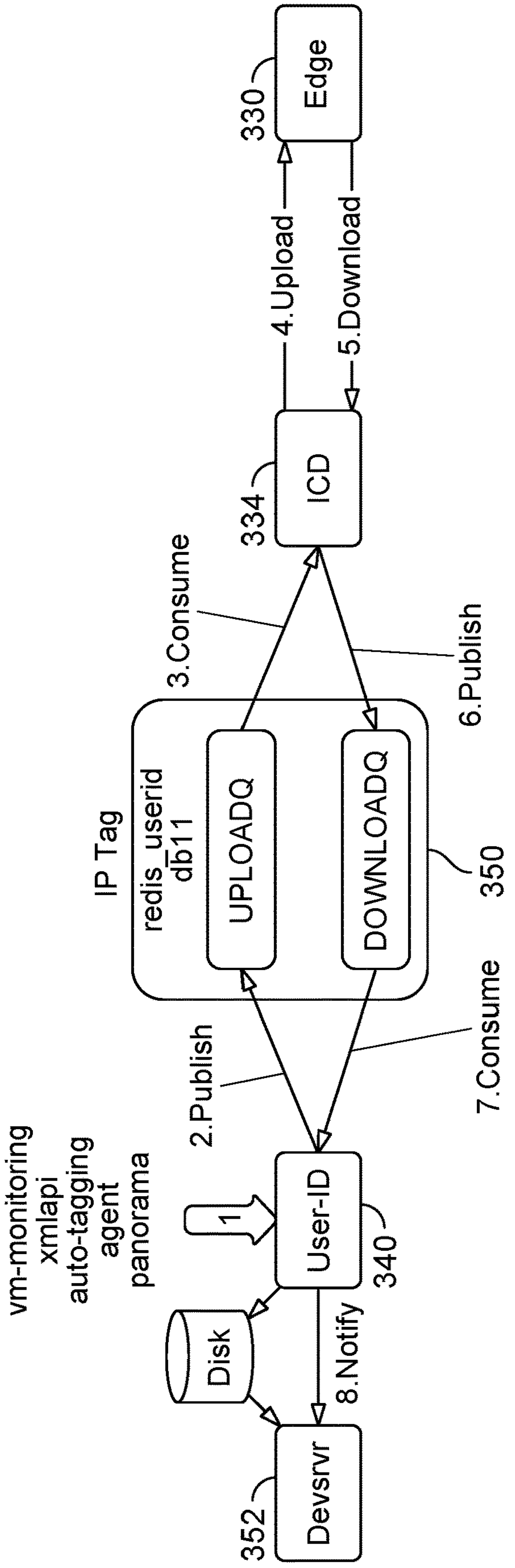
FIG. 3F illustrates an architecture for IP Tag mappings that can be uploaded and downloaded to the cloud for providing centralized identity redistribution for a security service in accordance with some embodiments.

FIG. 3F illustrates an architecture for IP Tag mappings that can be uploaded and downloaded to the cloud for providing centralized identity redistribution for a security service in accordance with some embodiments. As shown, IP Tag mappings can be similarly redistributed using the disclosed centralized identity redistribution techniques. For example, IP Tag mappings can be maintained in User-ID memory and saved on the disk as similarly shown at 350. The User-ID component can obtain the IP Tag mappings from various sources (e.g., VM-monitoring, XML API, auto-tagging, an agent, Panorama which is a management platform that is commercially available from Palo Alto Networks, Inc. headquartered in Santa Clara, CA, and/or various other sources can similarly be used). The User-ID component publishes the IP Tag mappings to the Redis "UPLOADQ." The ICD consumes the "UPLOADQ." The ICD uploads IP tag mappings to the Edge. The ICD downloads the IP Tag mappings from the Edge. The ICD publishes updates to the "DOWNLOADQ." The User-ID component consumes the "DOWNLOADQ." The User-ID component saves the updates to XML files on the local disk and then notifies the development server (Devsrvr) as shown at 352.

In another example implementation, IP-Port User mappings (e.g., and/or user context information, such as, other user mappings) can be similarly redistributed using the disclosed centralized identity redistribution techniques.

Figure 3G:
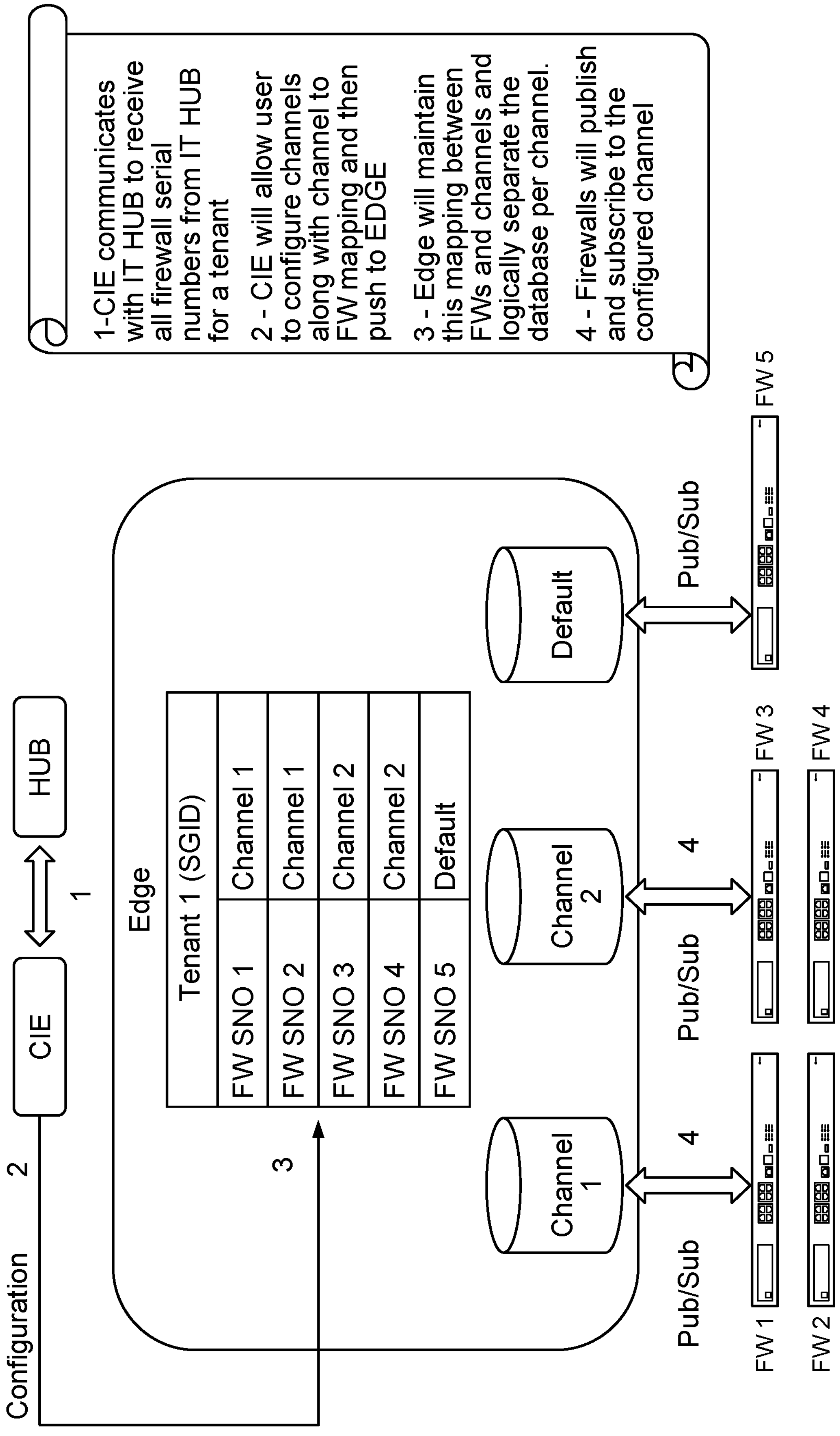
FIG. 3G illustrates an architecture for using segments for providing centralized identity redistribution for a security service in accordance with some embodiments.

FIG. 3G illustrates an architecture for using segments for providing centralized identity redistribution for a security service in accordance with some embodiments. Whenever user context data (e.g., user context information) is published by a security platform to the Edge (i.e. Broker/Edge-User-ID), the user context data is associated with (e.g., stored in) a segment (e.g., a segment generally refers to a grouping of security platforms/firewalls, and is also referred to herein as a channel, such as shown in FIG. 3F) configured by the CIE. All security platforms belonging to the same segment will receive this published data (e.g., each firewall is publishing data and subscribing user context data to the segment and the Edge will provide logical separation between the different segments in the Big Table data store).

In an example implementation, the Edge (i.e. Broker/Edge-User-ID) detects any changes to segments and moves the security platform(s) to the new segments. The Edge downloads all data from the new segment to the security platform(s) after the change. Existing old segment data in the cloud is untouched. Existing data on the security platform(s) from the old segment is left untouched. Data that has timeouts will timeout. Data that does not have timeouts like IP host or IP tags can stay on the security platform(s). Whenever the security platform(s) lose connection to the Edge for long periods of time (e.g., one minute or some other predetermined or configurable period of time), the following re-sync operation can be performed: (1) when the security platform(s) reconnect, the Edge can dump all data for the segment to the security platform(s); and (2) the security platform(s) can publish all new data to the Edge.

Figure 3H:
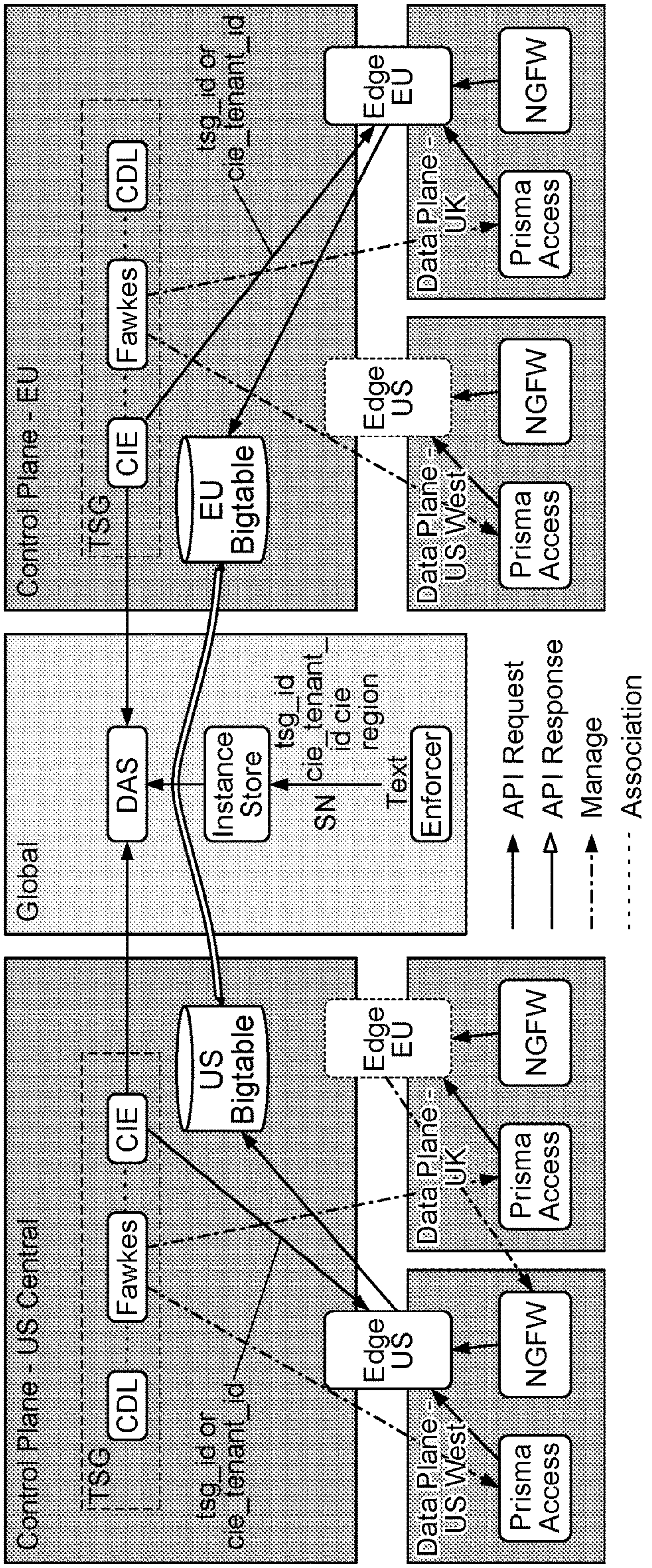
FIG. 3H illustrates a cloud-based User-ID component architecture for providing centralized identity redistribution for a security service in accordance with some embodiments.

FIG. 3H illustrates a cloud-based User-ID component architecture for providing centralized identity redistribution for a security service in accordance with some embodiments. In this example implementation, a DAS (Device Association Service) provides a solution for the customer to associate a group of devices (e.g., security platforms, such as a network gateway firewall (NGFW), Prisma Access (PA), software defined wide area network (SD-WAN), etc.) to a single tenant ID, referred to as the TSGID. As such, it will associate serial numbers of security platforms to the TSGID. The Enforcer component queries the instance store (e.g., front-end for DAS) to obtain the TSGID given a serial number. The enforcer instance is queried by the Edge to obtain the TSGID once a firewall connects to the Edge. The TSGID provides a global tenant ID to group all devices together generated by the DAS. As used herein, a segment TSGID generally refers to a global tenant ID for a customer that can be used across all the security services the customer can use (e.g., all the security platforms/firewalls and services (service tenant ids) can be mapped to this global TSGID, which can be used to provide data separation between customers in the Big Table backend).

In an example implementation, the workflow for an NGFW (e.g., security platforms/firewalls) is initiated with a customer onboarding the CIE, CDL, and FAWKES to the TSG. The DAS can then be used to associate firewall devices to the TSG. The CIE can then be used to configure segments for each of these associated devices provided by the DAS. This configuration is pushed to the Edge and globally available to all regions as shown in FIG. 3H. Finally, the firewalls can connect to the Edge deployed in a particular region based on a geolocation service (e.g., using the AWS geolocation service or another geolocation service). Once it connects, it will upload/download data based on the configuration pushed by the CIE.

In another example implementation, the workflow for PA (e.g., Prisma Access security solution that is commercially available from Palo Alto Networks, Inc. headquartered in Santa Clara, CA) is initiated with a customer onboarding the CIE, CDL, and FAWKES to the TSG. The DAS can then be used to associate a PA instance with the TSG. A SaaS agent can then push list of devices to the CIE. The CIE can configure segments on these devices. This configuration is pushed to the Edge and is globally available to all regions. PA firewalls can connect to the Edge deployed in a particular region based on a geolocation service (e.g., using the AWS geolocation service or another geolocation service). Once it connects, it will upload/download data based on the configuration pushed by the CIE.

In an example implementation, data replication can be performed to replicate user context information as will now be described. In some use cases, SD-WAN and PA can require that the data be replicated across regions (e.g., US, APAC, EU, etc.). For example, user context information, such as a particular IP user mapping created in the EU region should be available to be used on a security platform in the US region (e.g., such as for use cases where a data center security platform in the US needs to be accessed by users from different regions). Data replication in such use cases can be implemented using the above-described Big Table replication feature. For example, any IP-User mapping created in the EU region can be configured to automatically synchronize to the US region using the Google Cloud Platform (GCP) (e.g., which can be controlled by the global replication config on the segment).

Accordingly, the disclosed techniques for centralized identity redistribution can be implemented across different security platforms, including physical, VM, and container firewalls, and do not require any changes in existing customer deployments as similarly described above. The disclosed techniques for centralized identity redistribution can also simplify and unify redistribution of user context by providing a central source for consuming all user context information (e.g., using a publish and subscribe communication model, including for, for example, IP-Tag and User-Tag redistribution).

Further, the disclosed techniques for centralized identity redistribution facilitate cloud-based identity redistribution across segments and provide segment-based flow control for identity data (e.g., regions, such as similarly described above with respect to FIGS. 3A and 3B).

In addition, segment-based flow control for identity data facilitates reduced CPU and memory resources on each security platform (e.g., firewall or other security device/entity) as most processing/merging/storage is performed in the cloud and data is received from only one source. Moreover, adding/deleting security platforms (e.g., firewalls or other security devices/entities) is simple and does not require any configuration changes.

Figure 4A:
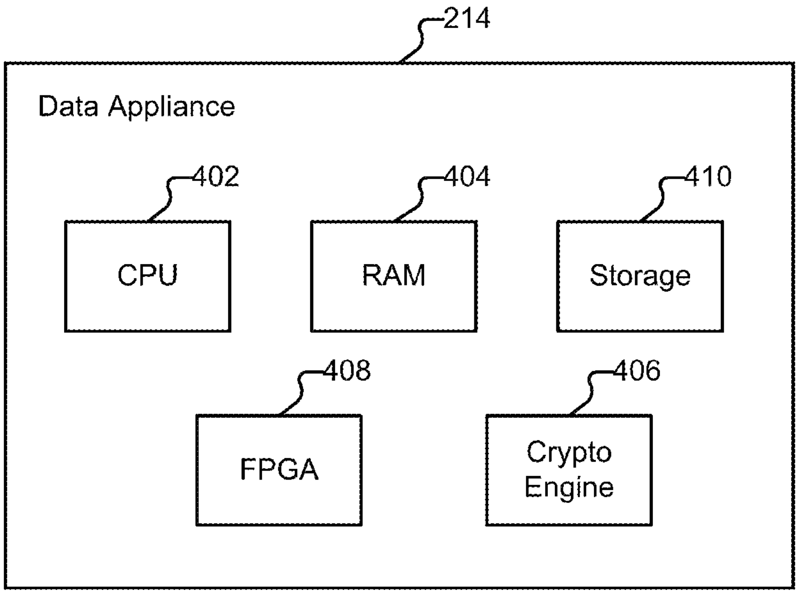
FIG. 4A illustrates an embodiment of a network gateway in accordance with some embodiments.

An embodiment of network gateway 214 is shown in FIG. 4A (e.g., such as network gateways shown at 214A-C in FIG. 2). The example shown is a representation of physical components that can be included in network gateway 214 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers (e.g., user identity/context information/data, such as similarly described herein), requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA Series firewall appliances).

Figure 4B:
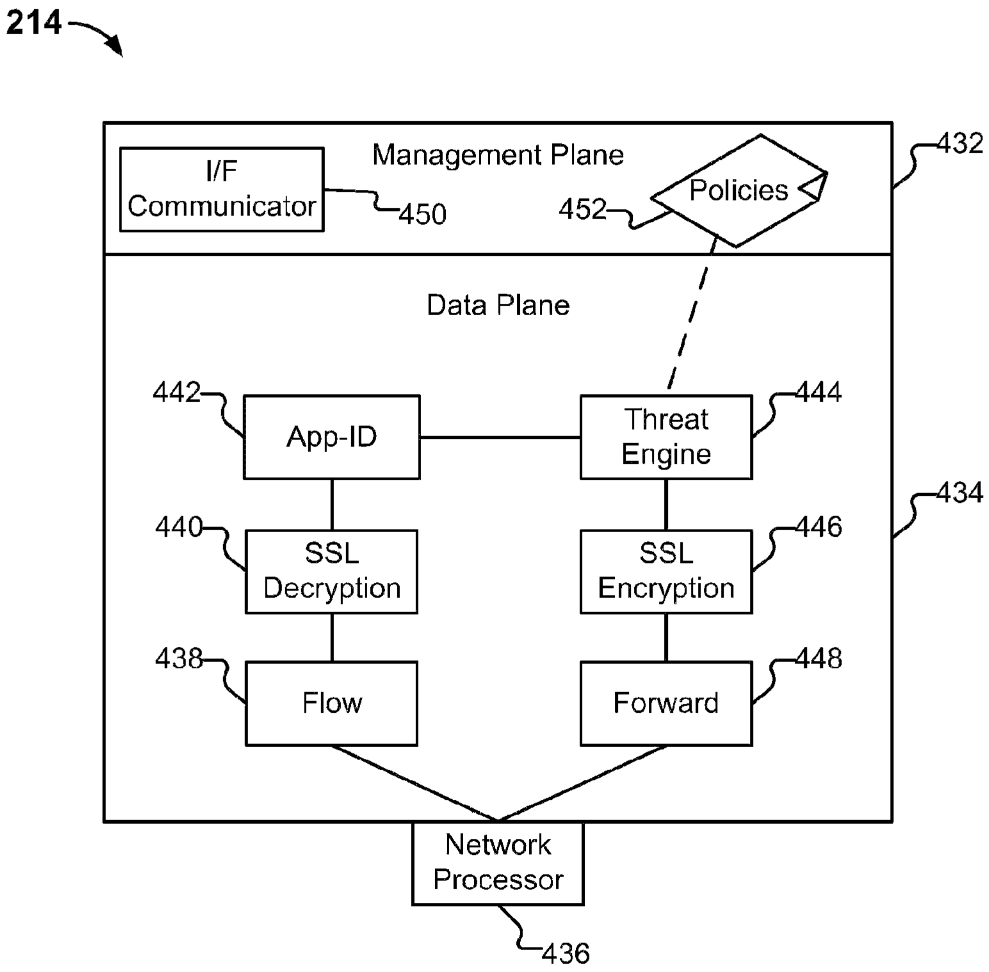
FIG. 4B is a functional diagram of logical components of an embodiment of a data appliance.

FIG. 4B is a functional diagram of logical components of an embodiment of a data appliance. The example shown is a representation of logical components that can be included in network gateway 214 in various embodiments (e.g., such as network gateways shown at 214A-C in FIG. 2). Unless otherwise specified, various logical components of network gateway 214 are generally implementable in a variety of ways, including as a set of one or more scripts (e.g., written in Java, python, etc., as applicable).

As shown, network gateway 214 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices, such as a client device (e.g., endpoint device, such as a user's laptop, smart phone, tablet, etc.), and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 214 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 214. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 (e.g., security/firewall policies) are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
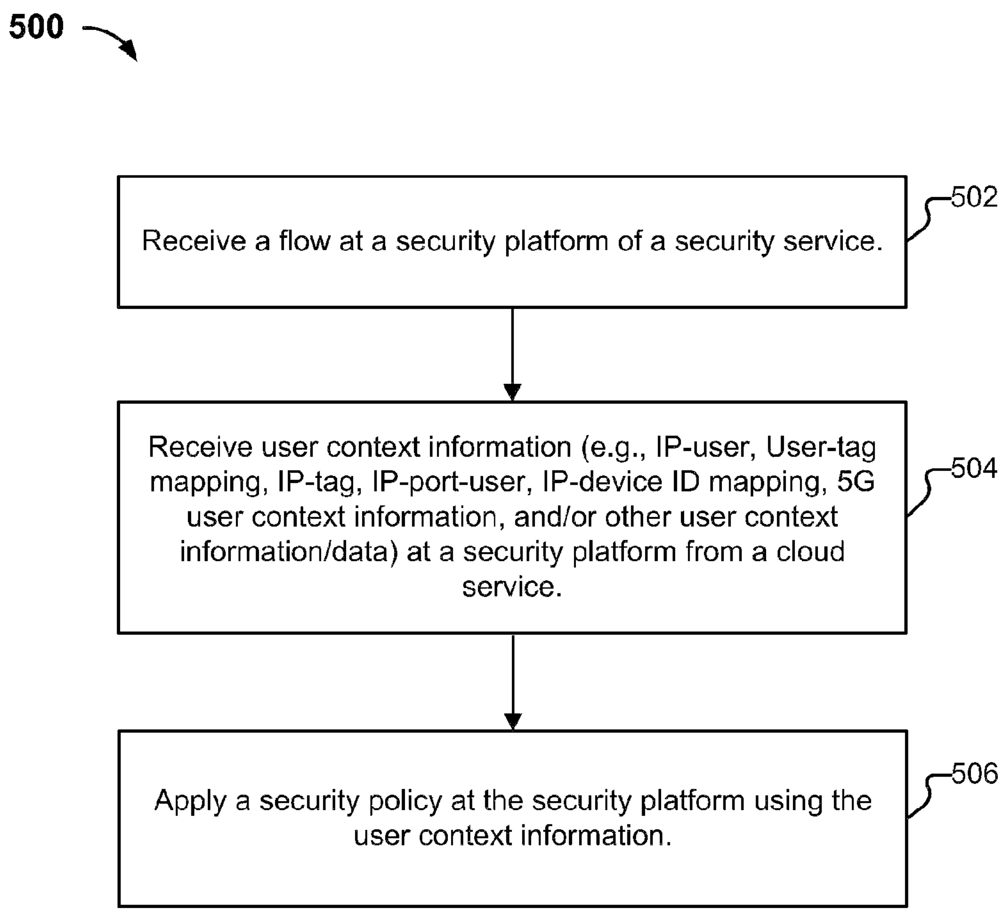
FIG. 5 is a flow diagram illustrating a process for providing centralized identity redistribution for a security service in accordance with some embodiments.

Example Processes for Providing Centralized Identity Redistribution for a Security Service FIG. 5 is a flow diagram illustrating a process for providing centralized identity redistribution for a security service in accordance with some embodiments. In one embodiment, process 500 is performed using the system architectures described above (e.g., such as described above with respect to FIGS. 1-4B).

The process begins at 502 when a flow is received at a security platform of a security service. For example, the security service can be a cloud-based security service as similarly described above.

At 504, user context information (e.g., an IP-user mapping, a User-tag mapping, an IP-tag mapping, an IP-port-user mapping, an IP-device ID mapping, 5G user context information, and/or other user context information/data) is received at a security platform from a cloud security service using the above-described centralized identity redistribution techniques.

At 506, a security policy is applied at the security platform using the user context information.

Figure 6:
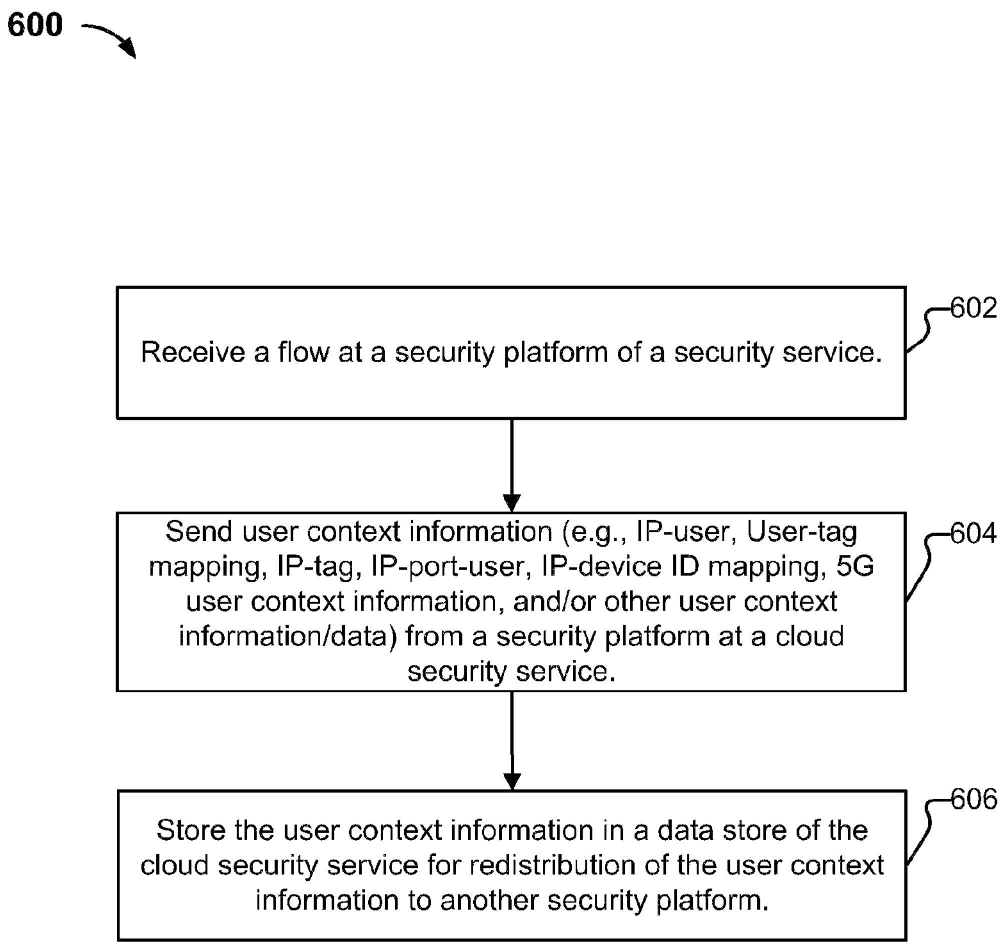
FIG. 6 is another flow diagram illustrating a process for providing centralized identity redistribution for a security service in accordance with some embodiments.

FIG. 6 is another flow diagram illustrating a process for providing centralized identity redistribution for a security service in accordance with some embodiments. In one embodiment, process 600 is performed using the system architectures described above (e.g., such as described above with respect to FIGS. 1-4B).

The process begins at 602 when a flow is received at a security platform of a security service. For example, the security service can be a cloud-based security service as similarly described above.

At 604, user context information (e.g., an IP-user mapping, a User-tag mapping, an IP-tag mapping, an IP-port-user mapping, an IP-device ID mapping, 5G user context information, and/or other user context information/data) is sent to a cloud security service from a security platform.

At 606, the user context information is stored in a data store of the cloud security service for redistribution of the user context information to another security platform using the above-described centralized identity redistribution techniques.

Figure 7:
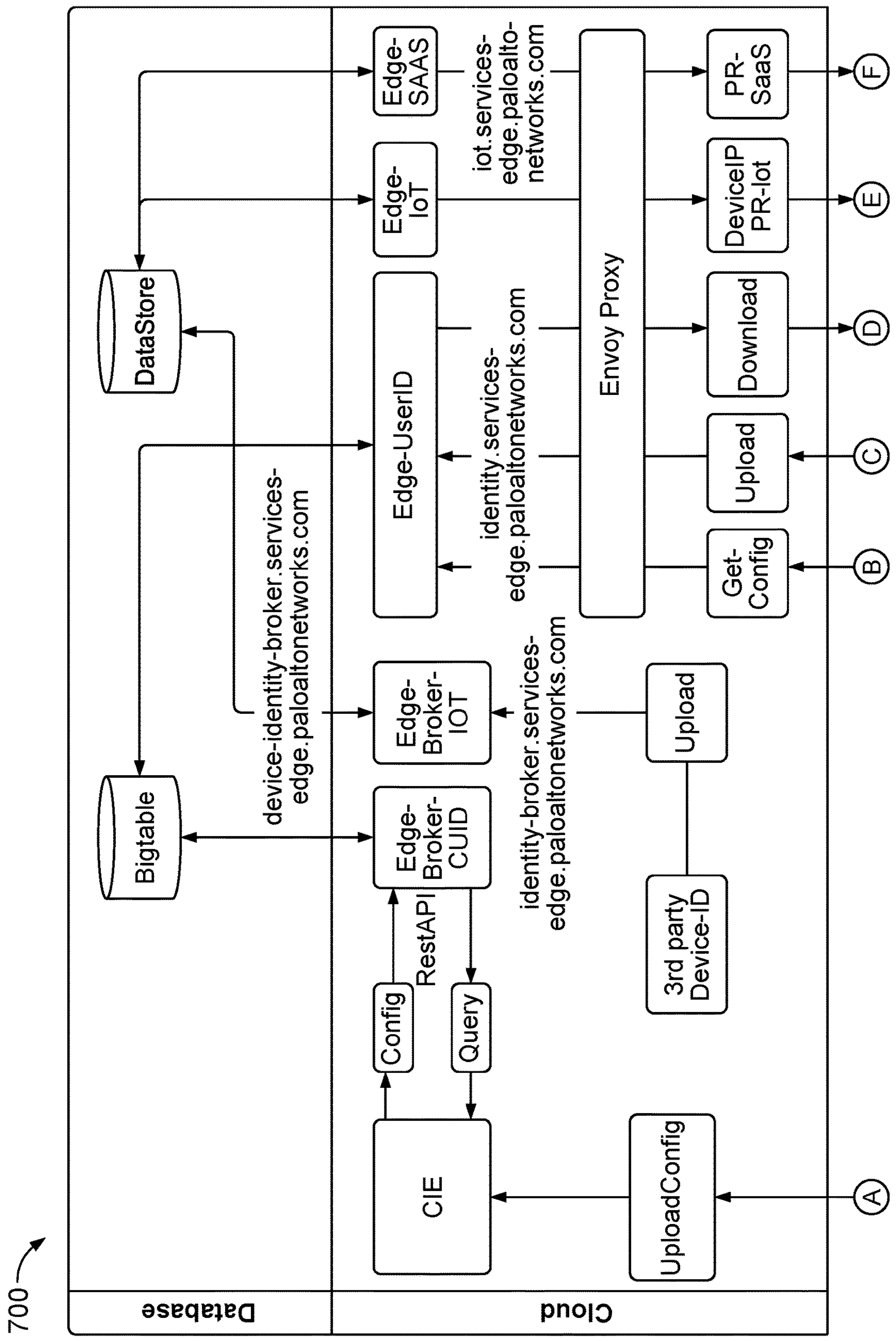
FIG. 7 is another flow diagram illustrating a process for providing centralized identity redistribution for a security service in accordance with some embodiments.
Figure 7:
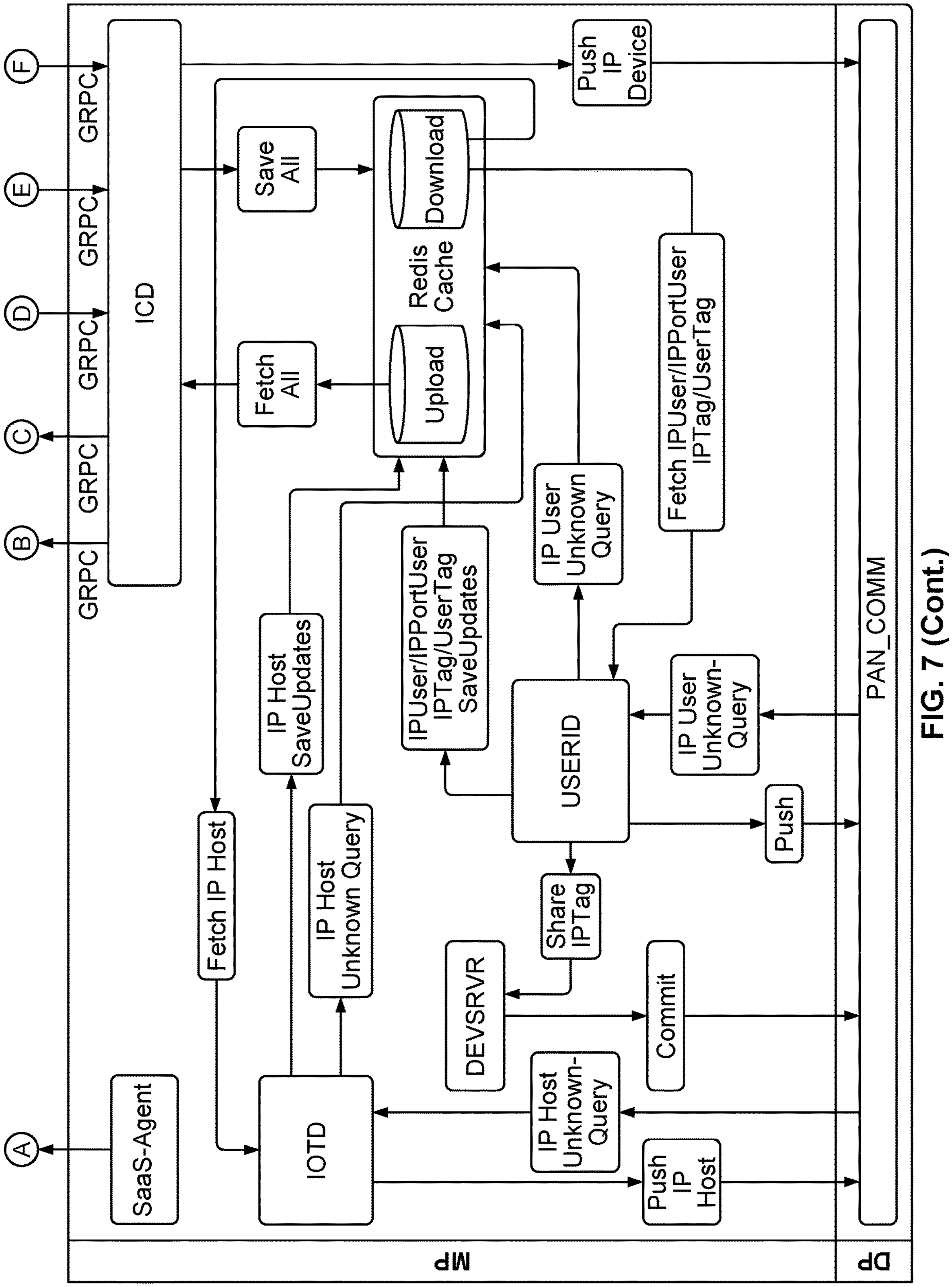

FIG. 7 is another flow diagram illustrating a process for providing centralized identity redistribution for a security service in accordance with some embodiments. In one embodiment, process 700 is performed using the system architectures described above (e.g., such as described above with respect to FIGS. 1-4B).

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A processor-implemented method, comprising:

receiving user context information at a security platform from a cloud security service, wherein the user context information comprises at least one of an IP-user mapping, a user-tag mapping, an IP-tag mapping, an IP-port-user mapping, and an IP-device ID mapping, wherein the user context information was produced at another authenticated security platform different from the security platform, wherein the cloud security service redistributes the user context information associated with a first user context data type using a publish and subscribe distribution model based on a segment for centralized identity redistribution and the cloud security service redistributes the user context information associated with a second user context data type using the publish and subscribe distribution model based on another segment for centralized identity redistribution, wherein the security platform subscribes to the segment, wherein the segment is a grouping of security platforms or firewalls, and wherein redistribution of the user context information is restricted to security platforms belonging to the segment; and applying a security policy at the security platform using the user context information.

2. The method of claim 1, wherein the security platform comprises a physical firewall, virtual machine firewall, or a container-based firewall.

3. The method of claim 1, wherein the security platform is an edge device in a SD-WAN network, wherein the edge device is configured to act as a connection and/or termination point of the SD-WAN network, and wherein the edge device is further configured to connect to the cloud security service via an IPsec tunnel.

4. The method of claim 1, wherein the cloud security service stores the user context information in a data store of the cloud security service for redistribution of the user context information to the security platform.

5. The method of claim 1, wherein the security platform is an authenticated platform of a security service, and wherein the method further comprises, prior to receiving the user context information, receiving incoming traffic at the security platform;

wherein the user context information is associated with an IP address of the incoming traffic; and wherein applying the security policy comprises attributing the incoming traffic to an identified user by associating the user context information with the IP address.

6. A system, comprising:

a processor configured to:

receive user context information at a security platform from a cloud security service, wherein the user context information comprises at least one of an IP-user mapping, a user-tag mapping, an IP-tag mapping, an IP-port-user mapping, and an IP-device ID mapping, wherein the user context information was produced at another authenticated security platform different from the security platform, wherein the cloud security service redistributes the user context information associated with a first user context data type using a publish and subscribe distribution model based on a segment for centralized identity redistribution and the cloud security service redistributes the user context information associated with a second user context data type using the publish and subscribe distribution model based on another segment for centralized identity redistribution, wherein the security platform subscribes to the segment, wherein the segment is a grouping of security platforms or firewalls, and wherein redistribution of the user context information is restricted to security platforms belonging to the segment; and apply a security policy at the security platform using the user context information; and a memory coupled to the processor and configured to provide the processor with instructions.

7. The system recited in claim 6, wherein the security platform comprises a physical firewall, virtual machine firewall, or a container-based firewall.

8. The system recited in claim 6, wherein the security platform is an edge device in a SD-WAN network, wherein the edge device is configured to act as a connection and/or termination point of the SD-WAN network, and wherein the edge device is further configured to connect to the cloud security service via an IPsec tunnel.

9. The system recited in claim 6, wherein the cloud security service stores the user context information in a data store of the cloud security service for redistribution of the user context information to the security platform.

10. The system recited in claim 6, wherein the security platform is an authenticated platform of a security service, and wherein the processor is further configured to, prior to receiving the user context information, receive incoming traffic at the security platform;

wherein the user context information is associated with an IP address of the incoming traffic; and wherein applying the security policy comprises attributing the incoming traffic to an identified user by associating the user context information with the IP address.

11. A computer program product, the computer program product being embodied in a tangible computer readable storage medium and comprising computer instructions for:

receiving user context information at a security platform from a cloud security service, wherein the user context information comprises at least one of an IP-user mapping, a user-tag mapping, an IP-tag mapping, an IP-port-user mapping, and an IP-device ID mapping, wherein the user context information was produced at another authenticated security platform different from the security platform, wherein the cloud security service redistributes the user context information associated with a first user context data type using a publish and subscribe distribution model based on a segment for centralized identity redistribution and the cloud security service redistributes the user context information associated with a second user context data type using the publish and subscribe distribution model based on another segment for centralized identity redistribution, wherein the security platform subscribes to the segment, wherein the segment is a grouping of security platforms or firewalls, and wherein redistribution of the user context information is restricted to security platforms belonging to the segment; and applying a security policy at the security platform using the user context information.

12. The computer program product recited in claim 11, wherein the security platform comprises a physical firewall, virtual machine firewall, or a container-based firewall.

13. The computer program product recited in claim 11, wherein the security platform is an edge device in a SD-WAN network, wherein the edge device is configured to act as a connection and/or termination point of the SD-WAN network, and wherein the edge device is further configured to connect to the cloud security service via an IPsec tunnel.

14. The computer program product recited in claim 11, wherein the cloud security service stores the user context information in a data store of the cloud security service for redistribution of the user context information to the security platform.

15. The computer program product recited in claim 11, wherein the security platform is an authenticated platform of a security service, and wherein the computer program product further comprises instructions for, prior to receiving the user context information, receiving incoming traffic at the security platform;

wherein the user context information is associated with an IP address of the incoming traffic; and wherein applying the security policy comprises attributing the incoming traffic to an identified user by associating the user context information with the IP address.

16. A processor-implemented method, comprising:

producing at an authenticated security platform user context information, and/or obtaining at the security platform user context information associated with a first user context data type from one or more sources, wherein the authenticated security platform publishes the user context information to a segment for centralized identity redistribution, and wherein the segment is a grouping of security platforms or firewalls; and sending the user context information associated with a first user context data type to a cloud security service, wherein the cloud security service stores the user context information in a data store of the cloud security service and associates the user context information for the first user context data type with the segment, wherein redistribution of the user context information is restricted to security platforms belonging to the segment, and wherein the cloud security service publishes the user context information associated with the first user context data type to a second security platform that subscribes to the segment.

17. The method of claim 16, wherein the security platform is an edge device in a SD-WAN network, wherein the edge device is configured to act as a connection and/or termination point of the SD-WAN network, wherein the edge device is further configured to connect to the cloud security service via an IPsec tunnel.

18. A processor-implemented method, comprising:

receiving user context information from a security platform at a cloud security service, wherein the user context information comprises at least one of an IP-user mapping, a user-tag mapping, an IP-tag mapping, an IP-port-user mapping, and an IP-device ID mapping; and storing the user context information in a data store of the cloud security service for redistribution of the user context information to another security platform, wherein the cloud security service associates the user context information associated with a first user context data type with a segment for centralized identity redistribution, wherein the segment is a grouping of security platforms or firewalls, wherein redistribution of the user context information associated with a first user context data type is restricted to security platforms belonging to the segment, and wherein the cloud security service publishes the user context information associated with a first user context data type to the segment.

19. The method according to claim 18, wherein the another security platform is subscribed to a segment for centralized identity redistribution to receive the user context information from the cloud security service.

20. The method according to claim 18, wherein the another security platform is subscribed to a segment for centralized identity redistribution to receive the user context information from the cloud security service, and wherein the method further comprises: publishing the user context information to the another security platform, and, wherein the segment is a grouping of security platforms or firewalls.

21. The method of claim 1, wherein the security platform is an authenticated platform of a security service, and wherein the method further comprises reconnecting to the cloud security service and performing a re-sync operation for receiving an update of the user context information associated with the first user context data type.

22. The method of claim 1, wherein the security platform is an authenticated platform of a security service, and wherein the method further comprises connecting to the cloud security service for receiving an update of the user context information associated with a tenant of the cloud security service based on a tenant ID segment that is predefined for the tenant of the security service, and wherein a plurality of security platforms associated with the tenant are subscribed to the tenant ID segment.

* * * * *